United States Patent [19]

Nomura et al.

[11] Patent Number: 5,159,372
[45] Date of Patent: Oct. 27, 1992

[54] LENS BARRIER

[75] Inventors: Hiroshi Nomura, Tokyo; Tomoaki Kobayashi, Niigata, both of Japan

[73] Assignee: Asahi Kogaku Kogyo Kabushiki Kaisha, Tokyo, Japan

[21] Appl. No.: 611,067

[22] Filed: Nov. 8, 1990

[30] Foreign Application Priority Data

| Nov. 9, 1989 [JP] | Japan | 1-30830[U] |
| Nov. 9, 1989 [JP] | Japan | 1-130831[U] |
| Dec. 22, 1989 [JP] | Japan | 1-148265 |

[51] Int. Cl.$^5$ ............................................. G03B 9/26
[52] U.S. Cl. ............................................. 354/253
[58] Field of Search ............... 354/195.1, 195.12, 202, 354/253

[56] References Cited

U.S. PATENT DOCUMENTS

| 3,918,076 | 11/1975 | Shono | 354/219 |
| 3,978,503 | 8/1976 | Shono | 354/250 |
| 4,876,563 | 10/1989 | Ishida et al. | 354/253 |
| 4,944,030 | 7/1990 | Haraguchi et al. | 354/195.12 X |
| 4,989,027 | 1/1991 | Ishii et al. | 354/253 |

FOREIGN PATENT DOCUMENTS

01171430 12/1989 Japan.
222901 9/1990 United Kingdom.

*Primary Examiner*—L. T. Hix
*Assistant Examiner*—J. K. Han
*Attorney, Agent, or Firm*—Sandler, Greenblum, & Bernstein

[57] ABSTRACT

A lens barrier for opening and closing a lens opening of a lens barrel, including a plurality of barrier plates which are spaced from one another in the direction of their thickness so as to slide in a direction perpendicular to the optical axis of the lens opening. A barrier driving mechanism is provided which moves the barrier blades between an open position in which the barrier blades are superimposed on one another outside the lens opening and a closed portion in which the barrier blades are located side by side in the lens opening to close the latter.

25 Claims, 4 Drawing Sheets

Fig_ 4

Fig_ 5A
(CLOSED POSITION)

Fig_ 5B
(OPEN POSITION)

Fig-6

LENS BARRIER

BACKGROUND OF THE INVENTION

1. Field of the Invention

The present invention relates to a lens barrier which opens and closes a lens aperture provided at a front end of a lens barrel.

2. Description of the Related Art

Recently, compact cameras tend to have a built-in lens barrier which opens and closes the lens aperture. The lens barrier essentially includes one barrier plate or a plurality of barrier plates which move in front of the lens aperture to open and close the same in association with the movement of a photographing lens between a retracted position in which the photographing lens is retracted in a camera body and a photographing position in which a picture of an object can be taken.

The number of the barrier plates can be decreased to one or two if there is enough space to accommodate the barrier plate or plates when they are retracted from the lens aperture. However, at the same time as recent compact cameras are becoming smaller, their lens apertures are becoming larger. This makes it difficult to provide a space large enough for accommodating the barrier plates.

A compact camera having four barrier plates is also available on the market. However, in this known camera, two of the four barrier plates move by parallel translation to each other and the other two rotate, thus resulting in a complicated construction.

Furthermore, conventional barriers must be actuated manually when the user wants to open and close the lens aperture. It is difficult to automatically move the barrier plates in association with the movement of the photographing lens between the retracted position and the photographing position.

In addition, in recent compact cameras recently there is a tendency toward increasing the size of the aperture of the lens to accommodate an increase in a focal length thereof, which results in an increase of the lens diameter. This in turn leads to an increase of the diameter of the barrier plates (blades). However, there is a need for a decrease in the diameter of the lens barrel. Even if the barrier is composed of only two barrier blades, it is difficult to provide a space in which the barrier blades and the drive mechanism thereof can be rotated and accommodated in the lens barrel.

There is also known, a zoom lens camera having a large magnification that has a lens cap which is also used as a lens barrier thus barrier blades are not required.

However, the attachment and detachment of a lens cap is troublesome and can cause a photographer to miss a chance at a good shot or to lose the lens cap. Accordingly, it is desirable to provide a barrier in a zoom lens camera having large magnification capability.

SUMMARY OF THE INVENTION

The primary object of the present invention is to provide a simple barrier requiring a smaller space to accommodate it.

Another object of the present invention is to provide a lens barrier which can be easily and automatically opened and closed.

The basic concept of the present invention focuses on making the barrier plates which are superimposed outside the lens opening such that they need a smaller accommodating space thereof.

Namely, according to the present invention, there is provided a lens barrier for opening and closing a lens opening of a lens barrel, comprising a plurality of barrier plates which are deviated from one another in the direction of their thickness so as to slide in a direction perpendicular to the optical axis. The lens barrier also includes a barrier-driving mechanism which moves the barrier blades between an open position, in which the barrier blades are superimposed on one another outside the lens opening, and a closed position, in which the barrier blades are located side by side in the lens opening to close the latter.

With this arrangement, since the barrier plates (blades) are superimposed and accommodated outside the lens opening in the open position of the lens opening, the accommodating space for the barrier plates can be made small, thus resulting in the realization of a small and compact camera having a larger lens opening.

In theory, the accommodating space can be minimized by increasing the number of barrier plates. In an average compact camera, since space for a shutter block, etc., must inevitably be provided around the lens opening, it is possible to provide the barrier plates in a space defined between the lens opening, the shutter block, and so on.

In view of this, it is possible to provide two pairs of barrier plates in a symmetrical arrangement with respect to the center of the lens opening, in order to make a sufficiently small accommodating space. Namely, in the present invention, the first and second barrier plates (blades) are offset from one another in the direction of their thickness in a symmetrical arrangement with respect to the center of the optical axis. The first barrier blade has a pair of barrier plates which are diametrically opposed to each other and are supported so as to linearly move in the radial direction of the lens opening so as to come away from and close to each other between the open position, (retracted position) in which the barrier plates come into contact with each other at the center of the lens opening, and the closed position, in which the barrier plates are retracted to the outside of the lens opening. A pair of barrier plates of the second barrier blade are also supported so as to move between the open position, in which the barrier plates are located outside the lens opening, and the closed position, in which the second barrier plates and the first barrier plates are located side by side to close the lens opening in association with the first barrier plates.

To automatize the opening and closing operations of the barrier plates, it is possible to provide a driving plate which rotates about the optical axis and which is connected to the first barrier plates through an association mechanism for linearly moving the first barrier plates in association with the driving plate. Preferably, the association mechanism comprises radial association grooves which are provided on the first barrier plates or the driving plate and association pins which are provided on the driving plate or the first barrier plates to be fitted in the association groove.

According to another aspect of the present invention, a lens barrier is provided having two barrier blades which move between a closed position, in which the barrier blades are superimposed to close a lens opening of a lens barrel and an open position, in which the barrier blades open the lens opening of the lens barrel. The lens between includes a barrier driving mechanism which supports the opposite ends of one of the barrier blades or the vicinity thereof to move it between the open position and the closed position. A guide mechanism is provided for slidably guiding the other barrier blade at the opposite ends of the latter or the vicinity thereof and outside the lens opening. Further, a first stop which comes into contact with the other barrier blade to move the latter to the open position during the movement of the one barrier blade from the closed position to the open position and a second stop which comes into contact with the other barrier blade to move the latter to the closed position during the movement of the one barrier blade from the open position to the closed position are provided.

In this regard, one of the two barrier blades which are moved between the open position and the closed position serves as a driver to drive the other barrier blade. Since the one of the barrier blades acting as the driver is supported by the barrier driving mechanism, and since the other barrier blade is slidably supported at the opposite ends thereof, no inclination of the barrier blades (plates) takes place. Furthermore, since the barrier plates are superimposed onto each other in the open position, the accommodation space can be made small.

Preferably, the barrier blades comprise two pairs of barrier plates which are located in a symmetrical arrangement with respect to the optical axis of the lens opening. Also, a pair of barrier plate driving mechanisms are located in a symmetrical arrangement with respect to the optical axis of the lens opening. Consequently, the first barrier plates come into contact with the corresponding second barrier plates at their opposed edges in the closed position.

According to still another aspect of the present invention, each of the barrier plate driving mechanisms comprises a pair of driving arms which are operatively interconnected to intersect each other and which are pivoted at their one end and outside the lens opening so as to rotate in opposite directions in association with each other. The driving arms are connected at their opposite ends to the opposite ends of the barrier plates of one of the barrier blades or the vicinity thereof.

With this arrangement, since the driving arms which intersect each other are pivoted at their one end and connected at the opposite ends to the opposite ends of the barrier plates, neither inclination of the barrier plates nor failure of the movement of the barrier plates occur.

According to another aspect of the present invention, a lens barrier comprises a plurality of barrier plates which move between a closed position in which a lens opening is closed and an open position in which the lens opening is opened. A plurality of linkages which rotate about an axis parallel with the optical axis slide the barrier plates between the open position and the closed position, and a driving ring rotates about the optical axis or moves along the optical axis are also provided. The linkages are placed on an imaginary circle having a center located on the optical axis. Provision is also made for association mechanism which transmit the movement of the driving ring to the barrier plates as a drive force in the direction of the slide movement through the linkages.

In this construction, the linkages serve as the drives which drive the barrier plates, and accordingly, the movement of the barrier plates can be ensured.

It is possible to provide lever members for each of the linkages, comprising drive transmitting levers which rotate about the respective supporting shaft portions and which are located on an imaginary circle having a center on the optical axis. The supporting shaft portions are connected to the rotational shaft portions of the linkages. The lever members are operatively connected to the driving ring which rotates about the optical axis, so that when the driving ring is rotated to rotate the drive transmitting levers, the linkages are driven by the supporting shaft portions.

BRIEF DESCRIPTION OF THE DRAWINGS

The invention will be described below in detail with reference to the accompanying drawings, in which.

DESCRIPTION OF PREFERRED EMBODIMENTS

Figure 1:
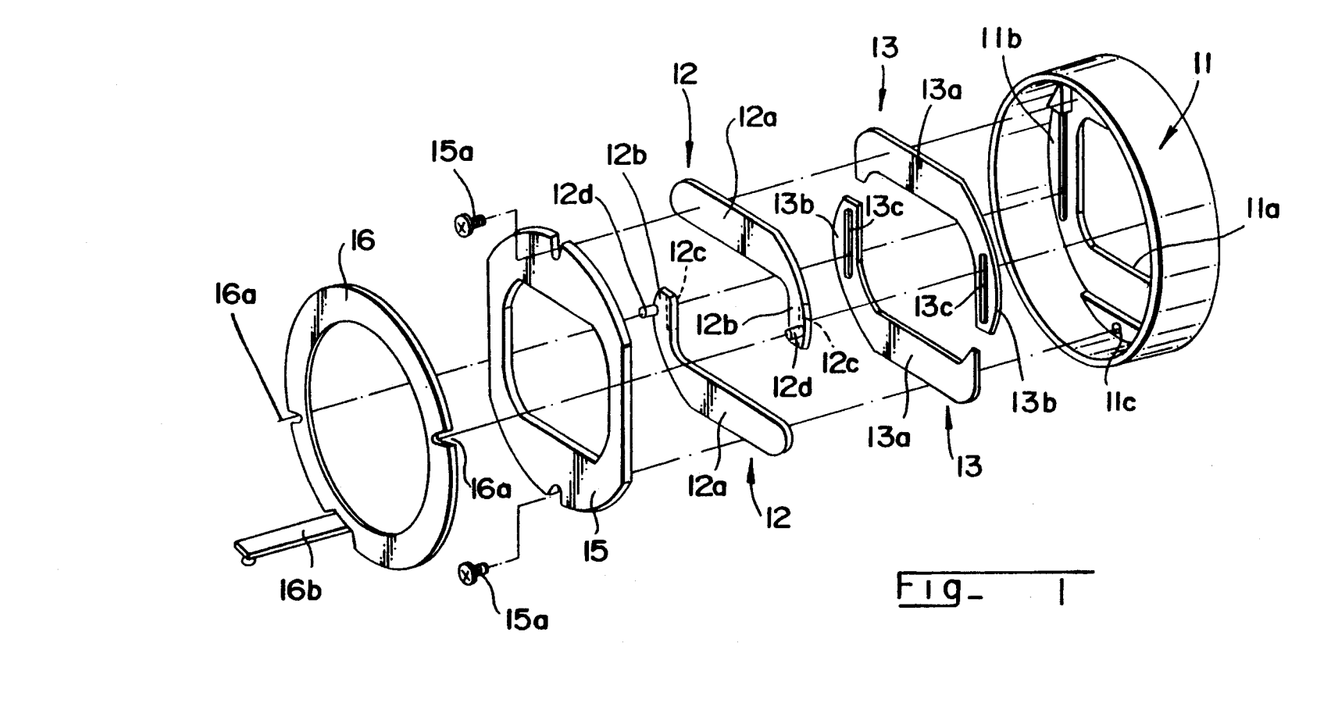
FIG. 1 is an exploded perspective view of a barrier according to one embodiment of the present invention.

A lens decorative frame (lens barrel) 11 which is located at the forefront portion of the lens barrel is provided on its front wall with a generally rectangular central opening 11a. A pair of slide movement restricting grooves 11b is provided on the rear surface of the front wall of the decorative frame 11 and extends in parallel with the shorter sides of the rectangular opening 11a. Also, stepped portions (projections) 11c are provided on the rear surface of the front wall of the decorative frame 11 so that first and second barrier blades 12 and 13 are received on the rear surface of the front wall of the decorative frame 11 so as to limit the opening position of the blades when they are no longer guided for movement by grooves 11b.

Figure 2:
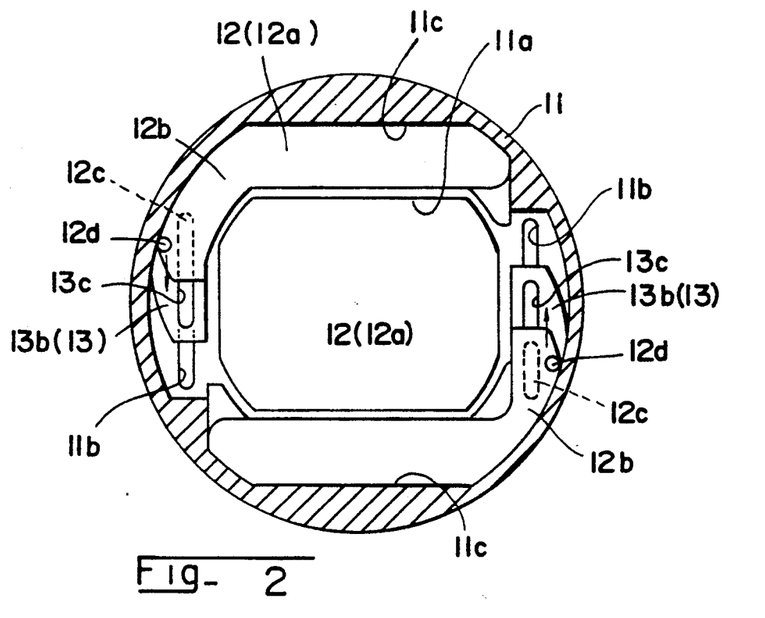
FIGS. 2 and 3 are back views of a barrier shown in an open position and a closed position, according to the present invention, respectively.

Pairs of first and second barrier blades 12 and 13 are symmetrically arranged with respect to the optical axis. Each pair of first and second barrier blades 12 and 13 consists of two generally L-shaped plates, each having an opening and closing portion 12a (13a) extending in parallel with the longer sides of the rectangular opening 11a and a driving portion 12b (13b). The first and second barrier blades 12 and 13 are superimposed one on another and are received in the lens decorative frame 11 to surround the rectangular opening 11a (FIG. 2).

The driving portions 12b of the first barrier blade 12 have key projections 12c on one surface thereof and association pins 12d on the other surfaces. The driving portions 13b of the second barrier plates 13 have elongated holes 13c in which the key projections 12c are fitted. Each of the elongated holes 13c is engaged by one end of the associated key projection 12c when the first and second barrier plates 12 and 13 are completely superimposed and by the other ends of the associated key projection 12c when the first and second barrier plates 12 and 13 are aligned (partially superimposed).

The key projections 12c extend through the elongated holes 13c to be fitted in the associated slide movement restricting grooves 11b of the decorative frame 11, so that the direction of the slide movement of the first and second barrier plates 12 and 13 is restricted. The barrier plates 12 and 13 are held between the lens decorative frame 11 and an annular supporting plate 15 which is secured to the stepped portions 11c of the decorative frame 11 by set screws 15a.

Into the lens decorative frame 11 an annular driving plate 16 is inserted which has a central circular opening and which is provided on its outer periphery with two radial association recesses (grooves) 16a which are diametrically opposed to each other. The association pins 12d of the first barrier plates 12 are fitted in the corresponding recesses 16a. The driving plate 16 has an arm 16b which extends in parallel with the optical axis.

When the driving plate 16 is rotated, the pair of first barrier plates 12 are moved with slide movement, along restricting grooves 11b between positions close to and away from each other through the association recesses 16a and the association pins 12d. When the driving plate 16 is rotated counterclockwise to move the association pins 12d in directions as shown with arrows in FIG. 2, in which the first and second barrier plates 12 and 13 are in an open position and the barrier plates 12 and 13 are superimposed outside the lens opening 11a to surround the latter, the first barrier plates 12 are first moved toward the center (optical axis) of the lens opening 11a.

At the beginning of the movement of the first barrier plates 12, the key projections 12c move in the elongated holes 13c of the second barrier plates 13 and no movement of the second barrier plates 13 takes place, assuming that no movement due to frictional force occurs. When the key projections 12c come to the ends of the associated elongated holes 13c, the second barrier plates 13 begin moving. When the opening and closing portions 12a of the first barrier plates 12 come into contact with each other at the center of the lens opening 11a, the opening and closing portions 13a of the second barrier plates 13 and the opening and closing portions 12a of the first barrier plates 12 are located side by side (aligned), so that the lens opening 11a is completely closed, as shown in FIG. 3.

Figure 3:
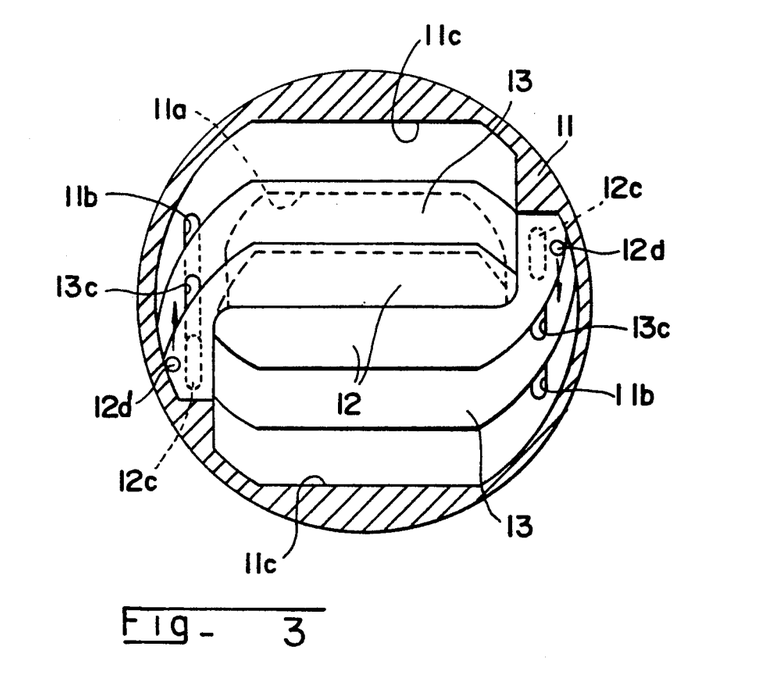

Conversely, when the driving plate 16 is rotated in the clockwise direction to move the association pins 12d in the directions shown with the arrows in FIG. 3, the first barrier plates 12 move away from each other, i.e. away from the center of the lens opening 11a. Since the key projections 12c of the first barrier plates 12 first move in the corresponding elongated holes 13c of the second barrier plates 13, no movement of the second barrier plates 13 takes place, assuming no movement due to frictional force occurs. When the first barrier plates 12 are superimposed on the second barrier plates 13, so that the key projections 12c of the first barrier plates 12 come to the ends of the elongated holes 13c of the second barrier plates 13, the second barrier plates 13 begin moving. As a result, the first and second barrier plates 12 and 13 move to the retracted (open) position outside the lens opening 11a while being superimposed on one, another (See FIG. 2).

Although it is possible to move the first barrier plates 12, for example by a manual lever, the use of the driving plate 16 makes it possible to easily and automatically open and close the lens barrier mechanism, since a slight angular displacement of the driving plate 16 causes the first barrier plates 12 to open and close. Namely, an existing cam ring (not shown) which is usually provided in a zoom lens camera to move the photographing lens between the retracted position and the photographing position can be used to rotate the driving plate 16. The cam ring is driven for example by a zoom motor (not shown) provided in the camera body.

Figure 4:
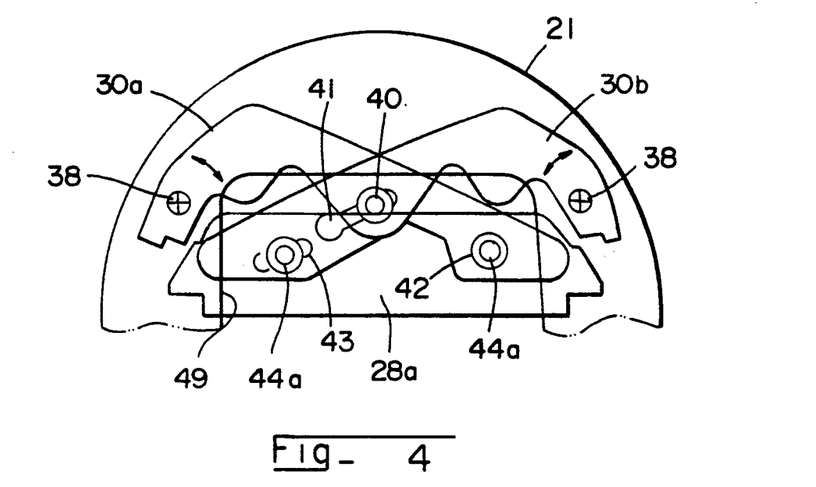
FIG. 4 is a schematic view of a barrier according to another embodiment of the present invention; another as FIGS. 5A and 5B are schematic views of barrier plates shown in a closed position and an open position of a lens aperture, respectively; and, FIG. 6 is an exploded perspective view of a barrier mechanism of a camera lens, shown in FIG. 4.
Figure 5A:
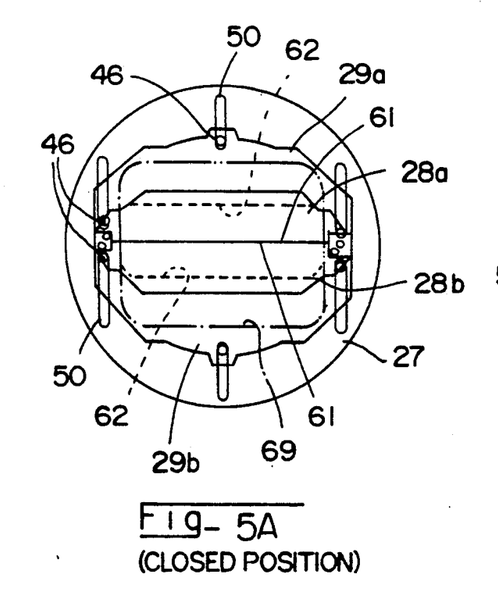
Figure 5B:
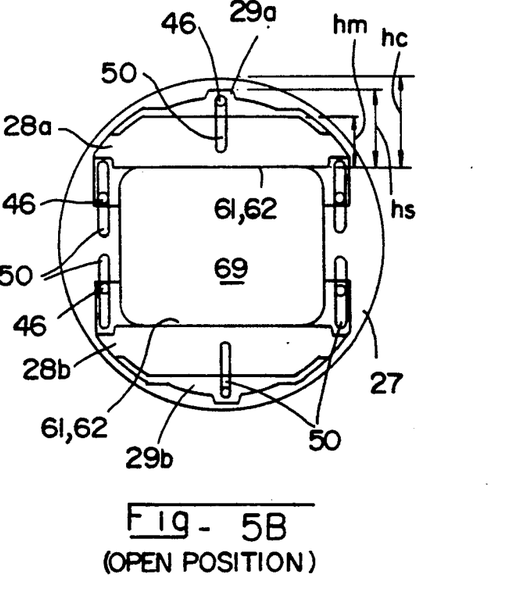
Figure 6:
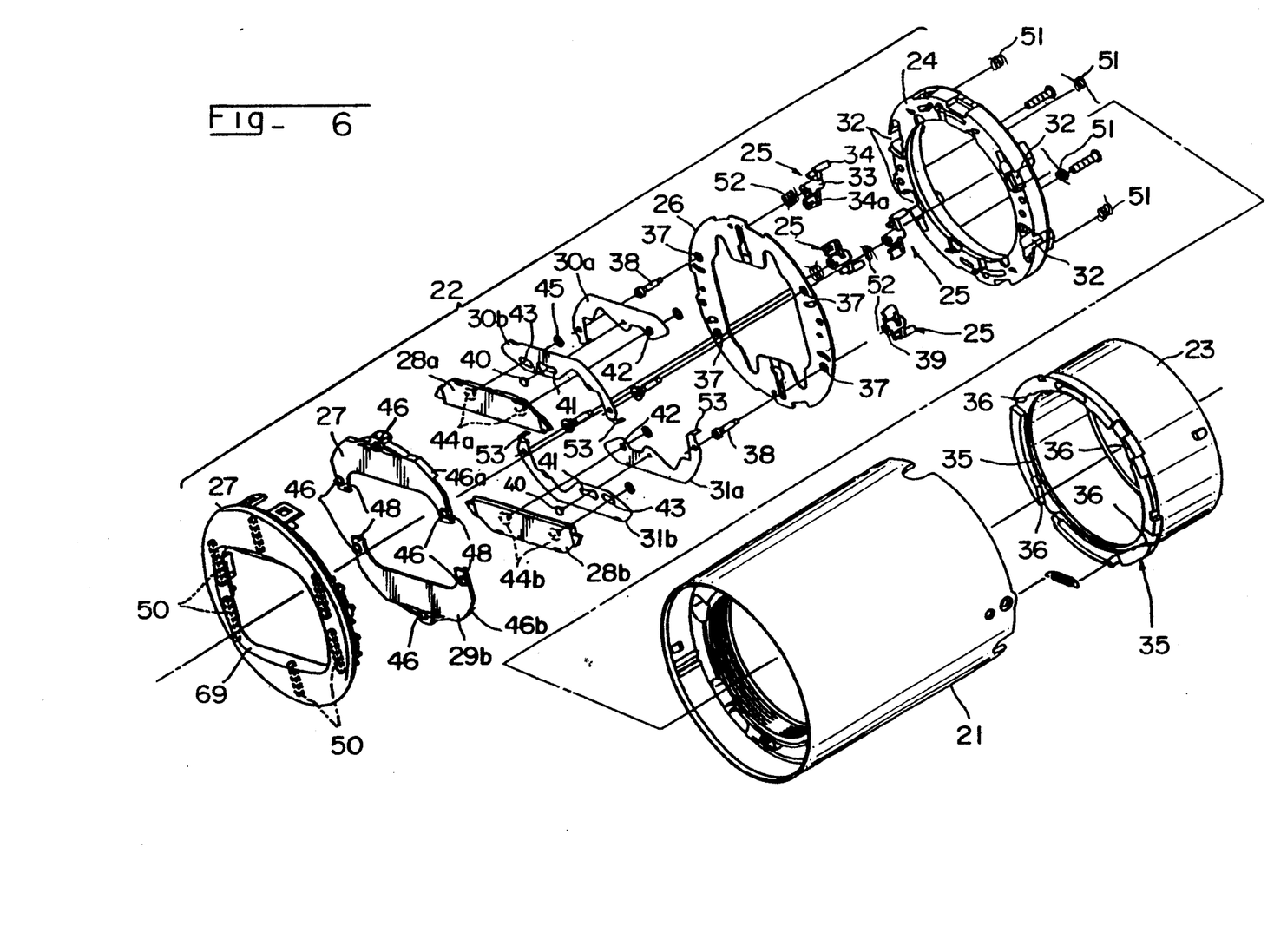

FIGS. 4 through 6 show another embodiment of the present invention. In the barrier mechanism shown in FIGS. 4, 5 and 6, a barrier block 22 is inserted in the lens barrel 21 from the front end thereof adjacent to an object to be taken, and a driving ring 23 is fitted in the lens barrel 21 from the rear end thereof adjacent to the camera body, as shown in FIG. 6.

The barrier block 22 has immovable elements in the form of a barrier supporting ring 24 and a lens decorative frame 27 secured to the barrier supporting ring 24. Between the barrier supporting ring 24 and the decorative frame 27 are provided four drive transmitting levers 25, a barrier holding plate 26 which rotatably holds the drive transmitting levers 25 on the barrier supporting ring 24, main barrier plates 28a and 28b, auxiliary barrier plates 29a and 29b, and driving arms 30a, 30b, 31a and 31b which directly actuate the main barrier plates 28a and 28b.

The barrier supporting ring 24 is provided on its outer periphery with four recesses 32 in which the drive transmitting levers 25 are rotatably held. The drive transmitting levers 25 have shaft portions 33 which can be rotatably fitted in the corresponding recesses 32, and arm portions 34 and engaging projections 34a which are provided on the outer periphery of the shaft portions 33 to be diametrically opposed to each other. The arm portions 34 extend toward the driving ring 23 and the engaging portions 34a extend in the direction opposite thereto. In an assembly in which the shaft portions 33 are received in the corresponding recesses 32 of the barrier supporting ring 24, the arm portions 34 projects toward the driving ring 23 from the barrier supporting ring 24 to come into slide contact with cam surfaces 36 of cam portions 35 provided on the periphery of the driving ring 23.

Each of the drive transmitting levers 25 has a torsion spring 51 attached thereto for biasing the arm portion 34 into slide contact with the cam surfaces 36. The torsion springs 51 have coil spring portions which are fitted on the shafts (not shown) provided on the barrier supporting ring 24 and opposite ends which are connected to the barrier supporting ring 24 and the shaft portions 34.

The barrier holding plate 26 has four holes 37 corresponding to the shaft portions 33 of the drive transmitting levers 25.

Pins 38 are secured to one end of the driving arms 30 (30a, 30b) and 31 (31a, 31b) and extend through the corresponding holes 37 to be loosely fitted in pin holes 39 formed in the drive transmitting levers 25. Consequently, the driving arms 30 and 31 and the drive transmitting levers 25 rotate together about the pins 38.

The pins 38 have torsion springs 52 surrounding them. The torsion springs 52 bear, at their one ends against the engaging projections 34 of the drive transmitting levers 25 and at their opposite ends against engaging projections 53 formed on the driving arms 30 and 31. Consequently, the drive transmitting levers 25 are functionally connected to the driving arms 30 and 31 through the torsion springs 52 to rotate together.

As can be seen in FIG. 4, the driving arms 30a and 30b which are in the shape of an elongated boomerang are secured at their one end to the front end of the corresponding pins 38 and intersect the other driving arms 30b and 30a at the opposite ends. The pin 40 provided on the intersecting portion of the driving arm 30a is fitted in an elongated hole 41 formed on the intersecting portion of the other driving arm 30b. Note that the lower driving arms 31a and 31b are symmetrical with respect to the optical axis with the upper driving arms 30a and 30b.

The driving arms 30a and 31a are provided, on their ends opposite to the ends to which the pins 38 are secured, with holes 42 and 42 to which the main barrier plates 28a and 28b are connected. Similarly, the driving arms 30b and 31b are provided, on their ends opposite to the ends to which the pins 38 are secured, with holes 43, 43

The main barrier plates 28a and 28b are in the shape of elongated trapezoids. The upper main barrier plate 28a has a pair of pins 44a and 44a which are loosely fitted in the hole 42 of the driving arm 30a and the hole 43 of the driving arm 30b, respectively. The lower main barrier 28bhas a pair of pins 44b and 44b which are loosely fitted in the hole 42 of the driving arm 31a and the hole 43 of the driving arm 31b, respectively. The numeral 45 designates retaining rings of the pins 44a and 44b.

The width "hm" of the main barrier plates 28a and 28b is smaller than "hc" which is equal to an inner diameter of the decorative frame 27 minus one half the width of the lens opening 69 (See FIG. 5B). The auxiliary barrier plates 29a and 29b are located closer to the object side than the main barrier plates 28a and 28b by a distance corresponding to the thickness of the main barrier plates, so that the auxiliary barrier plates 29a and 29b can be brought into contact with each other by sliding. The auxiliary barrier plates 29a and 29b are generally U-shaped.

The auxiliary barrier plates 29a and 29b are provided, on the center portions and the opposite ends of the surfaces thereof adjacent to the camera body, with guide pins 46, and on the opposite surfaces (adjacent to the main barrier plates 28a and 28b), with projecting edges 46a and 46b along the outer periphery of the auxiliary barrier plates 29a and 29b, respectively. The auxiliary barrier plates 29a and 29b have at their outer ends projections 48. The shape of the inner edges of the projecting edges 46a and 46b correspond to the shape of the upper edge portions of the main barrier plates 28a and 28b. The projecting edges 46a and 46b constitute a stop of the opening movement and the projections 48 constitute a stop of the closing movement.

Note that the width "hs" (See FIG. 5B) of the auxiliary barrier plates 29a and 29b at the center portions thereof is smaller than the above mentioned width "hc".

The center lens opening 69 is formed in the lens decorative frame 27. The lens decorative frame 27 also has guide grooves 50 on the circumference of the lens opening 69 to guide the movement of the auxiliary barrier plates 29a and 29b. The guide pins 46 of the auxiliary barrier plates 29a and 29b are slidably fitted in the associated guide grooves 50.

The main barrier plates 28a and 28b and the auxiliary barrier plates 29a and 29b, and the driving arms 30a and 30b, as well as 31a and 31b are received in a space between the barrier holding plate 26 and the decorative frame 27, which is secured to the barrier supporting ring 24 from above the barrier holding plate 26.

The following discussion will be directed to an assembly of the main barrier plates 28a, 28b and the driving arms 30a and 30b (FIG. 4). In FIG. 4, which shows an assembly of the upper main barrier plate 28a and the driving arms 30a and 30b, the upper main barrier plate 28a is in the closed position, in which the upper half of the lens opening 69 is closed.

The, combination of the main barrier plates 28a and the driving arms 30a and 30b constitutes, a limited linkage in which one or both of the driving arms 30a and 30b constitutes or constitute a driver and the main barrier(s) a constitute(s) a follower, so that when one or both of the driving arms 30a and 30b rotates or rotate, the main barrier plates 28a are driven.

For example, while one of the driving arms 30a and 30b is rotated in one direction, the other driving arm 30b or 30a is rotated at the same speed as the driving arm 30a or 30b in the opposite direction by the engagement of the pins 40 and the elongated holes 41. As a result, the line connecting the holes 42 and 43 is moved such that the line is parallel to the line connecting the pins 38 and 38 in accordance with the rotation of the driving arms 30a and 30b without changing the inclination of the line connecting the holes 42 and 43. Since the pins 44a of the main barrier plates 28a are fitted in the holes 42 and 43, the main barrier plates 28a are moved parallel to the line connecting the pins 38 in accordance with the rotation of the driving arms 30a and 30b. In this connection, the main barrier plates 28a are drivers and the auxiliary barrier plates 29a are followers.

When the driving arms 30a and 30b are rotated, the holes 42 and 43 are moved along the arched tracks, and accordingly, the distance between the holes 42 and 43 changes. To absorb the change in the distance between the holes 42 and 43, the hole 43 is in the form of an elongated hole, so that the pin 44a is slidable in the elongated hole 43 along therewith.

The barrier according to the present invention operates as follows.

When the driving ring 23 is rotated by the drive force from the camera body or by the operational force of a photographer, the arm portions 34 move along and on the cam surfaces 36 of the cam portions 35 in accordance with the cam profiles; so that the drive transmitting levers 25 are rotated about the shaft portions 33 into the closed position against the torsion springs 51 or into the open position by the spring force of the torsion springs 51.

The rotation of the drive transmitting levers 25 is transmitted to the driving arms 30a and 30b which are connected thereto through the torsion springs 52, so that the driving arms 30a and 30b are rotated in opposite directions to close or open the barrier plates 28 and 29 thereby, to open and close the lens opening 69.

More detailed description of the operation for opening the lens opening 69 will be given below.

Although the following description will be directed to the upper main barrier plates 28a and the upper auxiliary barrier plates 29a, it can be applied to the lower main barrier plates 28b and the lower auxiliary barrier plates 29b.

When the driving arms 30a and 30b are rotated in the "open" direction in FIG. 4, the front ends thereof, to which the main barrier plates 28a are connected, are moved (rotated) upward. As a result, the main barrier plates 28a which are connected to the driving arms 30a and 30b by the pins 44a are moved upward. Specifically, the main barrier plates 28a are moved toward the open position.

The upward slide movement of the main barrier plates 28a causes the upper edges thereof to come into contact with the projecting edges 46a of the auxiliary barrier plates 29a. Consequently, the auxiliary barrier plates 29a are moved upward by the main barrier plates 28a along the guide grooves 50 of the lens decorative frame 27 while being restricted by the loose fit of the guide pins 46 in the guide grooves 50.

When the lower edges 61 and 62 of the main barrier plates 28a and the auxiliary barrier plates 29a come to the outside of the lens opening 69, the slide movement of the main barrier plates 28 stops. As a result, the main barrier plates 28a and the auxiliary barrier plates 28b which are superimposed on one another are accommodated on the rear surface of the upper peripheral edge of the lens decorative frame 27, as shown in FIG. 5B, to fully open the lens opening 69.

The driving ring 23 is controlled so that it is stopped after the barrier plates 28a and 29a completely close the lens opening 69. In this open position, the arm portions 34 separate from the cam surfaces 36, so that the barrier plates 28 and 29 are elastically maintained in the open position by the torsion springs 51.

The following discussion will be directed to the operation for closing the lens opening 69 from the position shown in FIG. 5B.

When the driving arms 30a and 30b are rotated in the "close" directions shown by the arrows in FIG. 4, i.e., in the downward directions, the main barrier plates 28a are moved downward in accordance with the rotation of the driving arms 30a and 30b. Namely, the main barrier plates 28a slide toward the closing position. During the slide movement of the main barrier plates 28a, the lower edges thereof that constitute the stop of the downward movement come into contact with the projections 48 of the auxiliary barrier plates 29a that constitute the stop of the closing movement thereof to move the auxiliary barrier plates 29a in the open direction (downward direction in the drawing).

Consequently, the opposed edges 61 and 62 of the main barrier plates 28a and 28b come into contact with each other, so that the main barrier plates 28 and the auxiliary barrier plates 29 completely close the lens opening 69 and then stop moving (FIG. 5A). In the closed position, the barrier plates 28 and 29 are kept in the closed position by the spring force of the torsion springs 52.

The shapes of the barrier plates and the driving arms thereof are not limited to those in the illustrated embodiments. Although the main barrier plates 28 are supported and guided by the driving arms in the illustrated embodiments, it is possible to slidably support the main barrier plates 28 relative to the lens decorative frame 27 by guide pins and the guide grooves, similar to those of the auxiliary barrier plates 29. In this alternative, the hole 42 of the driving arm 30a must be an elongated hole, similar to the elongated hole 43 of the other driving arm 30b.

In the illustrated embodiments, although a pair of driving arms 30 are rotated to move the barrier plates, it is possible to transmit the driving force to only one of the driving arms, since when one of the driving arms is rotated, the other driving arm is rotated in association therewith.

As can be seen from the above discussion, according to the present invention, since the main barrier plates 28 are supported and linearly moved in parallel translation by the driving arms 30a and 30b, and since the auxiliary barrier plates 28 are linearly moved with the main barrier plates 28 acting as the drivers, no inclination of the barrier plates 28 and 29 takes place, so that the movement of the barrier plates 28 and 29 can be ensured.

When the driving ring 23 rotates in the closing direction, the driving arms 30 are rotated through the drive transmitting levers 25 and the torsion springs 52. As a result, even if, for example, no movement of the barrier plates 28 and 29 toward the close direction occurs, so that the driving arms 30 cannot be rotated, the drive transmitting levers 25, and accordingly, the driving ring 23 can still rotate while twisting the torsion springs 52, thus resulting in no breakage of the mechanism.

When the driving ring 23 rotates in the opening direction, the drive transmitting lever 25 is rotated by the spring force of the torsion springs 51. Accordingly, even if no movement of the barrier plates 28 and 29 toward the open position occurs, the driving ring 23 is free to rotate without an external force applied thereto.

In the closed position, since the large parts of the main barrier plates 28 and the auxiliary barrier plates 29 overlap, and since the driving arms 30 and 31 are accommodated in the profile of the barrier plates 28 and 29, no large accommodation on storage space is required.

Although there are two pairs of main and auxiliary barrier plates in the illustrated embodiments, it is possible to provide only two main barrier plates without the auxiliary barrier plates or a pair of main and auxiliary barrier plates.

Since the driving arms 30 and 31 are driven through the drive transmitting levers 25 which are placed on an imaginary circle having a center located on the optical axis, the drive power can be uniformly transmitted to the driving arms 30 and 31 to ensure the movement of the barrier plates 28 and 29. Furthermore, since the drive transmitting levers 25 are driven by the driving ring 43 which rotates about the optical axis through the cam mechanism, the drive transmitting levers 25 are simultaneously rotated at the same speed. Consequently, the driving force can be simultaneously and uniformly transmitted to the driving arms 30 and 31 and the barrier plates 28 and 29.

Alternatively, it is possible to provide a driving ring 23 which linearly moves along the optical axis or spirally like a screw. In this alternative, the cam surfaces 36 are formed along the direction of the movement of the driving ring 23.

If the driving ring 23 is located close to the driving arms 30 and 31, the drive transmitting lever 25 can be dispensed with. In this case, cam followers are provided on the driving arms 30 and 31 to come into slide contact with the cam surfaces 36 of the driving ring 23.

As can be understood from the foregoing, according to the present invention, a plurality of barrier plates are superimposed to be accommodated outside the lens opening and are located side by side to close the lens opening, and accordingly, the barrier plates can be accommodated in a small space. Consequently, even if the lens opening is made large, no increase in the size of the whole camera body due to the large lens opening is necessitated.

It is possible to utilize an inevitably existing space provided around the outer periphery of the lens opening as an accommodation space of the barrier plates. This satisfies the two requirements of making the lens opening larger and making the camera body smaller. Furthermore, the opening and closing operations of the barrier plates can be easily automated by a simple mechanism.

In the embodiments shown in FIG. 4 through 6, the barrier plate driving members are connected to the opposite ends of one of the two barrier plates 28 and 29 or the vicinity thereof to hold and move it between the open position and the closed position, and the other barrier plate 29 (or 28) is guided at its opposite ends so as to move between the open position and the closed position, as disclosed above. Furthermore, one of the barrier plates is a driver and the other is a follower. Accordingly, the barrier plates can be smoothly and certainly moved. Furthermore, since the accommodation space of the barrier plates in the open position can be made smaller, it is possible to provide the barrier plates in a compact lens barrel of a zoom lens camera having a large magnification, using a large diameter lens.

In addition to the foregoing, according to the present invention, since a plurality of links are provided on an imaginary circle having a center located on the optical axis to drive the slidable barrier plates, and since the driving ring which rotates about the optical axis or moves along the optical axis and the links are associated with each other, the links which constitute the drivers of the barrier plates are simultaneously and precisely moved, so that the barrier plates can be smoothly driven by the links.

We claim:

1. A lens barrier for opening and closing a lens opening of a lens barrel, comprising:
   a plurality of barrier plates which are spaced from one another in the direction of the thickness of said barrier plates so as to slide in a direction perpendicular to the optical axis; and,
   a barrier driving mechanism which moves said barrier plates between an open position in which said barrier plates are superimposed on one another outside the lens opening and a closed position in which said barrier plates are located side by side in the lens opening to close the opening.

2. A lens barrier according to claim 1, wherein said barrier plates comprises two paris of first and second barrier plates which are located in a symmetrical arrangement with respect to a center of the lens opening and which are offset from one another in the direction of the thickness of said barrier plates.

3. A lens barrier according to claim 2, further comprising guide means for guiding said pair of first barrier plates so as to move between said closed position in which said first barrier plates come into contact with each other substantially at the center of the lens opening and said opened position in which said first barrier plates are retracted to the outside of the lens opening.

4. A lens barrier according to claim 3, further comprising a driving plate which rotates about the optical axis, and wherein said first barrier plates and said driving plate are provided with first association means which causes a parallel translation movement of said first barrier plates in accordance with the rotation of said driving plate.

5. A lens barrier according to claim 4, wherein said association means comprises at least one radial association groove provided on one of said first barrier plates or said driving plate and at least one association pin which is provided on the other of said driving plate or said first barrier plates to be fitted in said association groove.

6. A lens barrier according to claim 5, further comprising a second association means for association said pair of second barrier plates with said first barrier plates so as to move in parallel translation between said open position in which said second barrier plates are retracted to the outside of the lens opening and said closed position in which said second barrier plates and said first barrier plates are located side by side to cooperate in closing the lens opening.

7. A lens barrier according to claim 6, wherein said first barrier plates have key projections extending in the direction of the slide movement of said first plates and said second barrier plates have elongated holes which extend in the direction of the slide movement of said second plates, whereby said key projections of said first barrier plates are fitted in the corresponding said elongated holes.

8. A lens barrier according to claim 7, further comprising a lens barrel having a lens opening, said lens barrel being provided with slide movement restricting grooves which extend in the direction of the slide movement, so that said key projections of said first barrier plates which extend through said elongated holes are fitted in the corresponding said slide movement restricting grooves.

9. A lens barrier according to claim 8, wherein said lens opening is generally rectangular, and wherein said first and second barrier plates move in a direction parallel with the shorter sides of the rectangle of said lens opening.

10. A lens barrier comprising:
    at least two barrier plates which move between a closed position and an open position;
    barrier driving means for supporting the opposite ends, or an area adjacent the opposite ends, of one of said barrier plates to move said one barrier plate between said open position, in which said barrier plates are superimposed on one another to open a lens opening of a lens barrel, and said closed position, in which said barrier plates are located side by side to close the lens opening of the lens barrel; and,
    association means for functionally connecting an other one of said barrier plates to said one barrier plate to move said other barrier plate between said open position and said closed position in association with said one barrier plate.

11. A lens barrier according to claim 10, wherein said association means comprises a first stop which comes into contact with said other barrier plate t move said other barrier plate to said open position during the movement of said one barrier plate from said closed position to said open position and a second stop which comes into contact with said other barrier plate to move said other barrier plate to said closed position during the movement of said one barrier plate from said open position to said closed position.

12. A lens barrier according to claim 11, further comprising guide means for slidably guiding said other barrier plate at the opposite ends of said other barrier plate or at the vicinity of the opposite ends of said other plate and outside the lens opening.

13. A lens barrier according to claim 12, wherein said barrier blades comprise two pairs of barrier plates which are located in a symmetrical arrangement with respect to the optical axis of the lens opening, and wherein said barrier driving means comprises a pair of barrier plate driving mechanisms which are located in a symmetrical arrangement with respect to the optical axis of the lens opening.

14. A lens barrier according to claim 13, wherein a pair of the barrier plates come into contact with a pair of other barrier plates at said opposite edges thereof in the closed position.

15. A lens barrier according to claim 14, further comprising a lens barrel having a lens opening, wherein said lens opening is generally rectangular and wherein said barrier plates move in a direction parallel with the shorter sides of the rectangle of said lens opening.

16. A lens barrier according to claim 15, wherein each of said barrier plate driving mechanisms comprises a pair of driving arms which are operatively interconnected to intersect each other and which are pivoted at one end and outside said lens opening so as to rotate in opposite directions with respect to each other, said driving arms being connected at the opposite ends to the opposite ends, or adjacent the opposite ends, of said barrier plates of one of said barrier blades.

17. A lens barrier according to claim 16, wherein one of each said pair of driving arms has a pin provided at the intersecting portion thereof, and wherein the other said driving arm has an elongated hole in which said pin is fitted.

18. A lens barrier according to claim 16, wherein said barrier plate comprise two pairs of barrier plates which are located in a symmetrical arrangement with respect to the optical axis of said lens opening, and wherein said barrier plate driving mechanisms are located in a symmetrical arrangement with respect to the optical axis of said lens opening.

19. A lens barrier according to claim 18, wherein said pivots of at lest one pair of said driving arms are located on an imaginary circle having a center on the center axis of said lens opening.

20. A lens barrier according to claim 19, wherein said pivots of said two paris of said driving arms are located on an imaginary circle having a center on the center axis of said lens opening.

21. A lens barrier according to claim 20, further comprising a driving ring which rotates about the optical axis of moves along the optical axis, and association means for transmitting the movement of said driving ring to said driving arms to rotate said driving arms.

22. A lens barrier according to claim 21, wherein said association means comprises an elastic drive transmitting means.

23. A lens barrier according to claim 22, wherein said association means comprises drive transmitting levers which are supported at said pivots of said driving arms to be rotated by said driving ring, and elastic members which elastically transmit the rotation of said drive transmitting levers to said driving arms.

24. A lens barrier according to claim 23, wherein said drive transmitting levers have arm portion sand wherein said driving ring has cam surfaces which come into contact with said arm portions of said drive transmitting levers to rotate said drive transmitting levers.

25. A lens barrier according to claim 24, wherein said elastic members are torsion springs.

* * * * *

UNITED STATES PATENT AND TRADEMARK OFFICE
CERTIFICATE OF CORRECTION

PATENT NO. : 5,159,372

DATED : October 27, 1992

INVENTOR(S) : H. NOMURA et al.

It is certified that error appears in the above-identified patent and that said Letters Patent is hereby corrected as shown below:

On the Title page, item [30]

The number of the first Japanese Priority Document listed should read as

<u>1-130830</u> instead of

<u>1-30830</u>

Signed and Sealed this

Nineteenth Day of October, 1993

*Attest:*

BRUCE LEHMAN

*Attesting Officer*     *Commissioner of Patents and Trademarks*